United States Patent [19]

Giron

[11] 4,100,249
[45] Jul. 11, 1978

[54] METHOD OF AND APPARATUS FOR MOLDING A RECEPTACLE

[75] Inventor: Jacques Pierre Max Giron, Saint Nizier sous Charlieu, France

[73] Assignee: Scolarma, Charlieu, France

[21] Appl. No.: 745,173

[22] Filed: Nov. 26, 1976

[30] Foreign Application Priority Data

Nov. 28, 1975 [FR] France .............................. 75 36456

[51] Int. Cl.² .................... B29C 1/12; B29C 1/16; B28B 7/30; B22C 9/24
[52] U.S. Cl. .................................... 264/313; 249/139; 249/144; 249/150; 264/318; 264/334
[58] Field of Search .............. 249/122, 123, 124, 178, 249/179, 180, 150, 151, 153, 163, 165, 167, 183, 141, 142, 166, 169, 149, 177; 425/DIG. 43, 440, DIG. 14, DIG. 53, DIG. 124; 164/365, 137; 264/299, 333, 334, 313, 314

[56] References Cited

U.S. PATENT DOCUMENTS

| | | | |
|---|---|---|---|
| 720,718 | 2/1903 | Maddock | 425/DIG. 14 |
| 1,698,836 | 1/1929 | Bartley | 249/169 X |
| 2,392,561 | 1/1946 | Weber | 249/141 X |
| 3,120,028 | 2/1964 | Streeter | 249/183 |
| 3,136,831 | 6/1964 | Zinn | 264/225 |
| 3,345,438 | 10/1967 | Carey | 425/440 X |
| 3,345,438 | 10/1967 | Carey | 249/183 X |
| 3,355,772 | 12/1967 | Kolberg | 249/151 X |
| 3,622,117 | 11/1971 | Lerman | 249/183 X |
| 3,815,863 | 6/1974 | Andeweg | 264/314 X |

Primary Examiner—Francis S. Husar
Assistant Examiner—John S. Brown
Attorney, Agent, or Firm—Michael J. Striker

[57] ABSTRACT

A pair of like mold parts are juxtaposed to form a mold cavity having a relatively large maximum cross-sectional size and an opening of relatively small cross-sectional size. A core is positioned in this cavity and has a body of cross-sectional size greater than that of the mold-cavity opening and having a neck extending out of the cavity through the opening and blocking this opening. A mass of hardenable material is introduced into the cavity around the core and is hardened. Thereafter the core is elastically deformed and withdrawn from inside the hardened mass whereupon the mold parts are displaced apart to demold the hardened mass.

10 Claims, 5 Drawing Figures

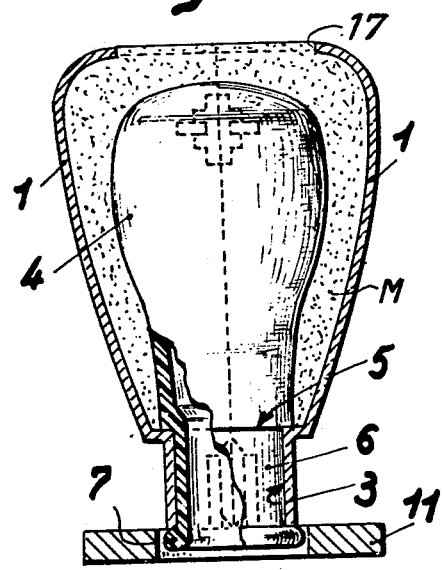
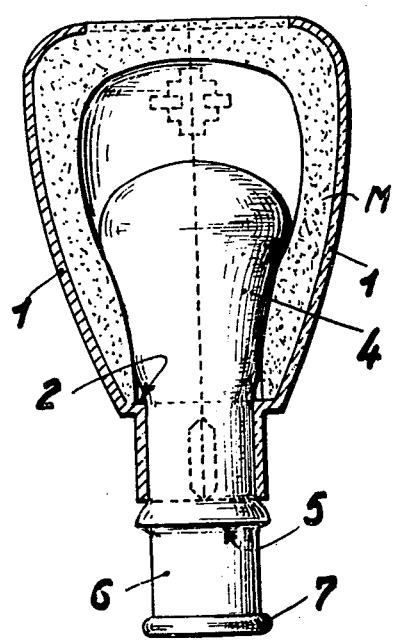
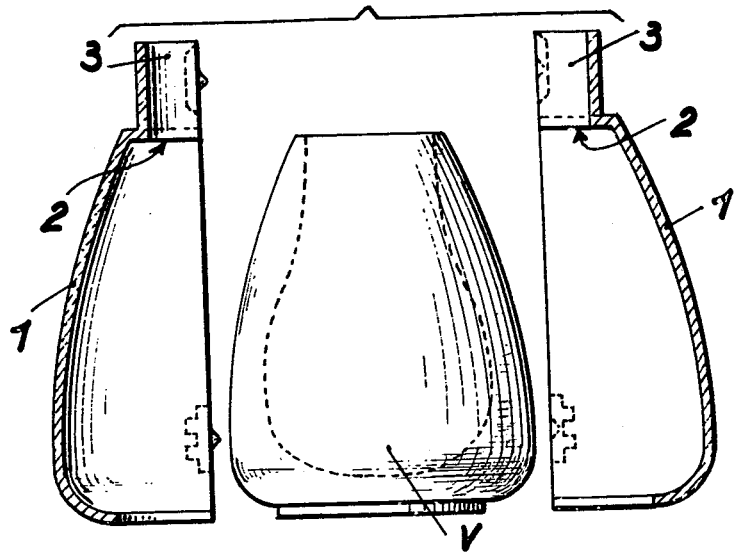

METHOD OF AND APPARATUS FOR MOLDING A RECEPTACLE

BACKGROUND OF THE INVENTION

The present invention relates to a method of and an apparatus for molding. More particularly this invention concerns the molding of a receptacle having an interior which is of considerably larger cross-sectional size than its mouth.

In the molding or casting of a receptacle such as a bottle whose mouth is of considerably smaller cross-sectional size than its interior, it is necessary to employ relatively complicated molding techniques. When the material being molded is of extremely high viscosity and has good surface tension it is possible to blow mold such a receptacle. Such blow molding is useful, for instance, when glass bottles are being made. Blow-molding equipment is comparatively expensive and its functioning is relatively complicated so that the cost of the finished product is somewhat high.

It is also known to centrifugally cast such articles. In this arrangement after the still-fluid hardenable material is introduced into the mold the mold is spun at high speed about its central axis. During such spinning the material is centrifugally pressed against the interior of the mold cavity. The spinning is continued until the material hardens into a receptacle having a hollow interior at the spinning axis. Such an arrangement not only requires relatively expensive casting equipment, but has the disadvantage that it is difficult exactly to control the shape of the hollow interior space inside the article being cast.

It has finally been suggested to provide a core for such devices. This core is invariably provided in several parts so that it can be pulled part-by-part out of the interior of the cast article once it has hardened. In practice such devices have not reached any wide degree of acceptance due to the complexity of operation and the considerable difficulty often encountered with extricating the multipart core from inside the finished article.

SUMMARY OF THE INVENTION

It is therefore an object of the present invention to provide an improved method of and apparatus for molding and casting.

Another object is to provide a method and apparatus for forming a receptacle having a hollow interior which is of larger maximum cross-sectional size than its mouth.

These objects are attained according to the present invention in an arrangement wherein a mold is used in conjunction with an elastically deformable core.

More particularly this mold has a pair of complementary halves or shell parts which together form the mold cavity. At the bottom of this mold cavity these parts form a lower opening which is of considerably smaller cross-sectional size than the maximum cross-sectional size of the mold cavity. At the top of the mold cavity another opening is provided into which a mass of hardenable material may be introduced. Means is provided on the mold halves securing them together during the introduction of the hardenable material, the hardening of this material and the downward withdrawal of the elastically deformable mold core through the lower opening of the mold.

With the system according to the present invention it is therefore possible to mold a receptacle or the like and impart to its interior an exact shape, that is the shape defined by the outside surface of the elastically deformable mold core. Unlike blow-molding operations or centrifugal casting arrangements the shape of the interior space need not be centered on a particular axis nor formed as a body of revolution or even as a smooth shape at all, as virtually any desired configuration can be given to the mold core. It is merely necessary that the force necessary to deform the mold core into an undesirable shape be greater than the maximum force which will be applied inwardly against this mold core during the steps of introducing the mass of hardenable material into the mold cavity and of hardening this material. Once the material is hardened the mold core is forceably withdrawn from inside the hardened mass so as to elastically inwardly deform this core and pull it out the mouth of the hardened article. In order to prevent damage to this hardened article this step is preferably done according to the present invention before the mold halves are displaced apart for demolding of the finished article.

In accordance with yet another feature of this invention the lower opening of the mold cavity is completely blocked during the molding operation by the neck of the mold core. The mold core itself is unitarily formed of elastically deformable material, preferably a synthetic resin which is heat resistant and has an outside surface that readily separates from the mass of material being cast around it.

It is noted that with the system according to this invention it is possible to exactly form articles of materials which could not be used for blow molding, such as clay or coarse porcelain. It is also possible to form molded articles having a square-section or otherwise polygonal-section interior, something completely impossible with most known molding techniques.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

FIG. 3 is a vertical section through the mold assembly according to this invention during the casting operation;

FIG. 4 is a view similar to FIG. 3 showing extraction of the mold core; and

FIG. 5 is a view showing the final stages of the molding operation in accordance with this invention.

DESCRIPTION OF A PREFERRED EMBODIMENT

Figure 1:
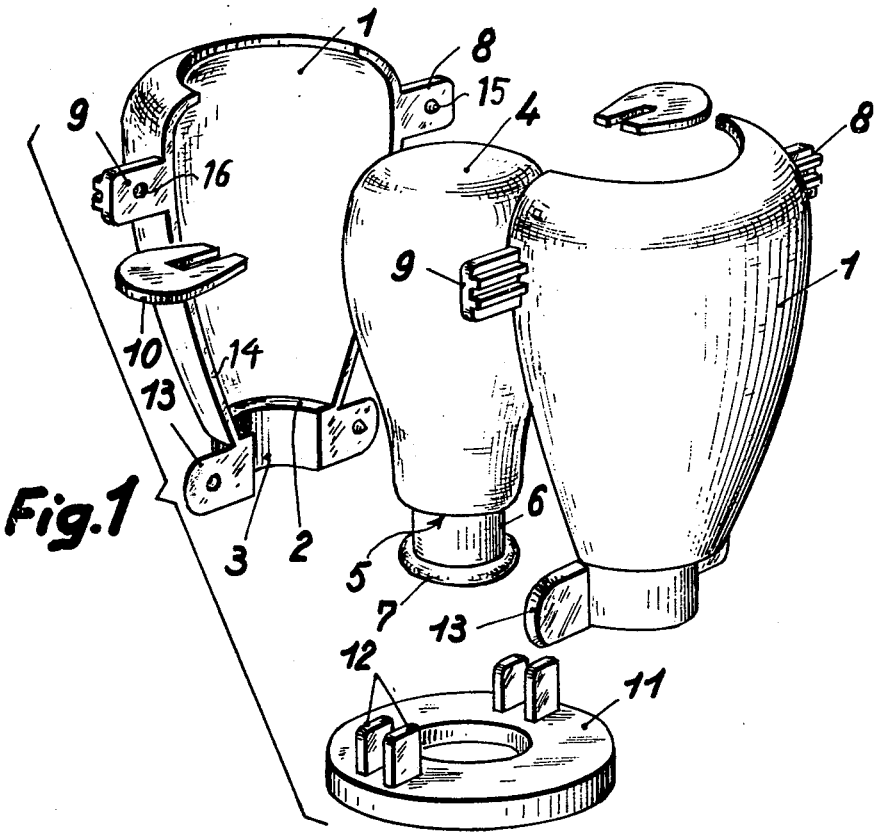
FIG. 1 is a perspective exploded view of the apparatus for the method according to this invention.
Figure 2:
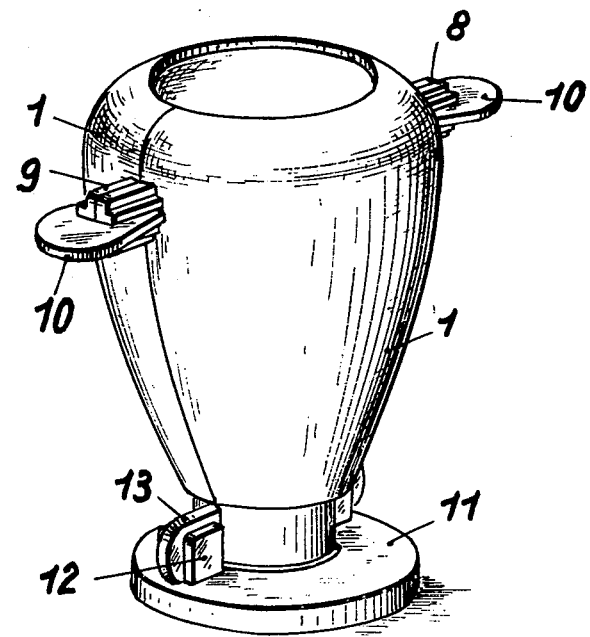
FIG. 2 is a view similar to FIG. 1 showing the mold assembly in condition for use.

As shown in FIGS. 1 and 2 a mold according to this invention basically comprises a pair of shell parts 1 of complementary shape. Each of these parts has an internal semicircular shoulder 2 defining a semicylindrical neck portion 3. Furthermore each of the mold parts 1 has a planar face 13 that can abut flatly against the corresponding planar face 14 of the other part 1.

Inside the mold cavity formed by the two mold halves 1 is receivable with spacing a resiliently and elastically deformable core 4 having a shoulder 5 dimensioned to fit snugly on top of the two shoulders 2 and a neck 6 adapted to fit snugly within the two semi-cylindrical neck portions 3. At its lower end the neck 6 has a laterally extending rim 7 which lies against the lower ends of the neck portions 3 while the shoulder 5 lies on the shoulders 2 as best shown in FIG. 3.

In addition each of the mold halves 1 is formed in its upper region at the parting planar surface 14 with a pair of tabs 8 and 9 one of which is provided with a centering pin 15 and the other of which is formed with a hole 16 adapted to receive the centering pin 15 of the other mold half 1. When the two halves 1 are juxtaposed together as shown in FIG. 2 it is possible for a clip 10 to be slipped over the two tabs 9 and another clip 10 to be slipped over the two halves 8 to hold the two halves 1 tightly together.

In addition a washer base 11 is provided having two pairs of upstanding tabs 12 adapted to embrace tabs 13 similar to the tabs 8 and 9 and formed on the neck portions 3 so as to hold the mold halves 1 together at their lower region.

In use the two halves 1 are assembled as shown in FIG. 2 with the core 4 lying between them. Each of the halves 1 is formed with a semicircular opening that constitutes with the corresponding opening of the other half 1 a circular hole 17 that is oriented upwardly when the assembled mold structure is stood on the base 11 as shown in FIG. 3.

The user then pours into the hole 17 a mass M of hardenable material so as to fill up all of the space within the mold cavity formed by the two halves 1 to the level of the opening 17 as shown in FIG. 3.

Thereafter as shown in FIG. 4 the material is allowed to harden until it is sufficiently rigid that the core 4 can be pulled out from inside the hardened mass M without deforming this mass M, but with inward elastic deformation of the core 4 to a maximum size no greater than the cross-sectional area of the neck portions 3.

The core 4 is completely pulled out of the mass M and then as shown in FIG. 5 the two halves 1 are separated so as to produce a finished article V which can readily serve as a vase or the like. There is no need to inject the mass M in FIG. 3 under pressure, nor is complicated equipment required so that it is possible to produce the article V at extremely low cost. Such a molding assembly can readily be used as an educational toy.

The mold halves 1 are formed of relatively rigid material. It is possible to use a Teflon-coated hollow polyurethane body for the core 4. It might also be necessary in some instances to coat the core 4 with a parting agent before use of it.

It will be understood that each of the elements described above, or two or more together, may also find a useful application in other types of molding systems, differing from the types described above.

While the invention has been illustrated and described as embodied in a molding apparatus for forming hollow receptacles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

I claim:

1. A method of molding comprising the steps of:
   (a) juxtaposing a pair of mold parts to form a mold cavity having a relatively large maximum cross-sectional size and having an upper opening and a lower opening of relatively small cross-sectional size forming a neck portion of the mold separated from said cavity by a shoulder;
   (b) positioning in said cavity a hollow core having a body of cross-sectional size greater than that of said lower opening and having a shoulder dimensioned to fit snugly against the shoulder adjacent said neck portion of the mold, a neck extending out of said cavity through said lower opening and adapted to fit snugly within said neck portion of the mold and a laterally extending portion provided at the lower end of the neck of the core adapted to abut against the lower end of the neck portion of the mold when the latter receives the core, said hollow core having an outer elastically inwardly deflectable surface of predetermined shape;
   (c) introducing a mass of hardenable material into said cavity from said upper opening of the mold around said core substantially without elastic deformation of the latter;
   (d) hardening the introduced mass;
   (e) temporarily elastically deforming said core and simultaneously withdrawing the same from the hardened mass; and
   (f) displacing said mold parts apart to demold the hardened mass and automatically elastically returning said outer surface to said predetermined shape.

2. The method defined in claim 1, wherein said body is withdrawn in step (e) through said opening before the displacement of said mold parts of step (f).

3. The method defined in claim 1; further comprising the step of blocking said opening completely with said neck during steps (c) and (d).

4. The method defined in claim 1; further comprising the step of clamping said parts together during steps (c) and (d).

5. The method defined in claim 1; further comprising the step of orienting said parts with said upper opening at the bottom of said cavity, said core being withdrawn in step (e) downwardly out of said hardened mass.

6. A molding apparatus comprising: a pair of mold parts juxtaposable to form a mold cavity of a relatively large maximum cross-sectional size having an upper opening and a lower opening of relatively small cross-sectional size and forming a neck portion of the mold separated from said cavity by a shoulder; a hollow mold core having a body part of a cross-sectional size greater than said lower opening and having a shoulder dimensioned to fit snugly against the shoulder adjacent said neck portion of the mold, a neck extending out of said cavity through said lower opening and adapted to fit snugly within said neck portion of the mold and a laterally extending portion provided at the lower end of the neck portion of the mold when the latter receives the core, said hollow core being fittable within said mold and said body being elastically inwardly compressible to a cross-sectional size at most as great as that of said lower opening, said body having an outer surface defining normally a predetermined shape.

7. The apparatus defined in claim 6, wherein said core is unitarily formed of elastically deformable material.

8. The apparatus defined in claim 6, wherein said mold parts are complementary mold halves joinable along a parting plane, said halves each having outwardly directed tabs at said plane, said apparatus furhter comprising clips engageable over the tabs of juxtaposed halves to hold said halves together.

9. The apparatus defined in claim 6; further comprising clamping means including laterally projecting tabs on said mold parts and clips engageable thereover for holding said mold parts together at their upper region.

10. The apparatus as defined in claim 6, further comprising a mold base having two pairs of upstanding tabs adapted to embrace corresponding projections formed on the neck portion of the mold, so as to hold the mold parts together at their lower region.

* * * * *